United States Patent [19]

Kelly et al.

[11] Patent Number: 4,701,180

[45] Date of Patent: Oct. 20, 1987

[54] IMPLANTED ANCHOR AND INSERT WITH ANALOG DISPLAY

[76] Inventors: L. Thomas Kelly; Esther V. M. Hamel, both of Rte. 1, Box 68, St. Ignatius, Mont. 59865; Robert P. Bielka, 2211 N. 59th St., Seattle, Wash. 98103

[21] Appl. No.: 830,999

[22] Filed: Feb. 19, 1986

[51] Int. Cl.[4] ............................................. A61M 5/00
[52] U.S. Cl. ................................... 604/891; 604/175; 128/736; 119/1
[58] Field of Search ............... 604/891, 892, 890, 175, 604/285; 119/1 R; 128/736

[56] References Cited

U.S. PATENT DOCUMENTS

| | | |
|---|---|---|
| 945,978 | 1/1910 | Nielsen et al. |
| 3,090,235 | 5/1963 | Houser |
| 3,140,611 | 7/1964 | Kliewer |
| 3,280,629 | 10/1966 | Kliewer |
| 3,479,876 | 11/1969 | Kliewer |
| 3,548,780 | 12/1970 | Kliewer |
| 3,559,615 | 2/1971 | Kliewer |
| 3,626,897 | 12/1971 | Kliewer |
| 3,651,734 | 3/1972 | McSherry |
| 3,656,452 | 4/1972 | Kliewer |
| 3,682,130 | 8/1982 | Jeffers |
| 3,693,579 | 9/1972 | Kliewer |
| 3,759,103 | 9/1973 | Volk |
| 3,811,402 | 5/1974 | Keeley et al. |
| 3,844,273 | 10/1974 | Polson |
| 3,889,658 | 6/1975 | Newhall |
| 3,946,734 | 3/1976 | Dedrick et al. |
| 3,948,263 | 4/1976 | Drake, Jr. et al. |
| 3,982,536 | 9/1976 | Krogseng et al. |
| 3,982,537 | 9/1976 | Bucalo |
| 4,083,364 | 4/1978 | Kelly et al. |
| 4,111,202 | 9/1978 | Theeuwes |
| 4,209,014 | 6/1980 | Sefton |
| 4,344,434 | 8/1982 | Robertson |
| 4,351,337 | 9/1982 | Sidman |
| 4,449,982 | 5/1984 | Gould |
| 4,457,752 | 7/1984 | Vadasz |
| 4,487,603 | 12/1984 | Harris |
| 4,506,680 | 3/1985 | Stokes ............................... 604/891 |

FOREIGN PATENT DOCUMENTS

| | | | |
|---|---|---|---|
| 174865 | 3/1986 | European Pat. Off. ............ | 604/890 |
| 2152373 | 8/1985 | United Kingdom ................ | 604/890 |

OTHER PUBLICATIONS

The Missoulian, Dec. 23, 1979, p. B-6.
Holm et al., "Electronic Identification and Temperature Monitoring in Livestock", circa 1973-1974.

*Primary Examiner*—Stephen C. Pellegrino
*Attorney, Agent, or Firm*—Graybeal, Jensen & Puntigam

[57] ABSTRACT

An animal insert with analog display is provided for use with an anchor inserted behind the animal's ear into a region commonly known as the Kelly triangle. The region is bounded cranially by the posterior border of the conchal cartilage and caudally by the anterior border of the cleido-occipitalis muscle. The anchor comprises an anchor flange positioned against the animal's skin, a sleeve extending into the animal and having internal threads engaging corresponding external threads on the insert, and a healing material and a plurality of barbs for retaining the anchor in the animal. The insert comprises an insert flange positioned adjacent the anchor flange, a tube extending into the animal through the sleeve of the anchor, and one or more capsules or pellets of a dissolving medicant-containing material or a liquefying diagnostic material disposed within a lower end of the tube. A piston within the tube is forced by a piston spring toward the lower end of the tube as the one or more pellets liquefy or dissolve, unreeling a string from a pulley attached to a longitudinal shaft connected to a radial indicator arm visibly located outside of the flange, causing the indicator arm to gather up a reflective sheet from the flange to expose the brightly colored surface thereof, thereby producing a proportionate analog display of the extent of progressive liquefaction or dissolution of the one or more pellets.

34 Claims, 17 Drawing Figures

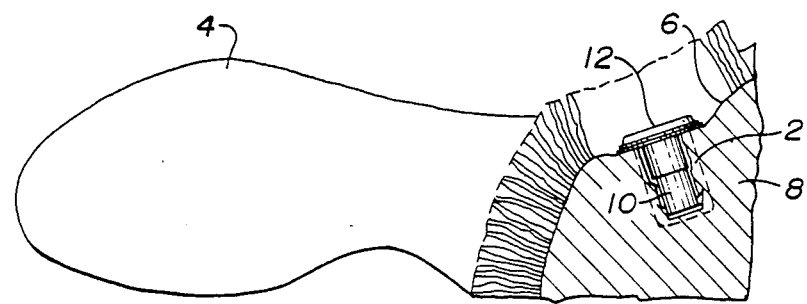
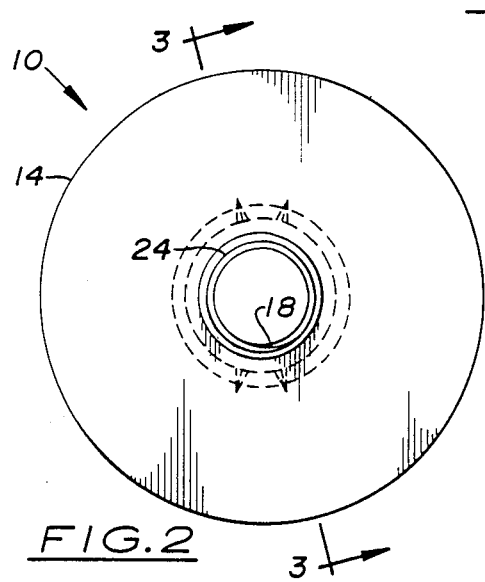
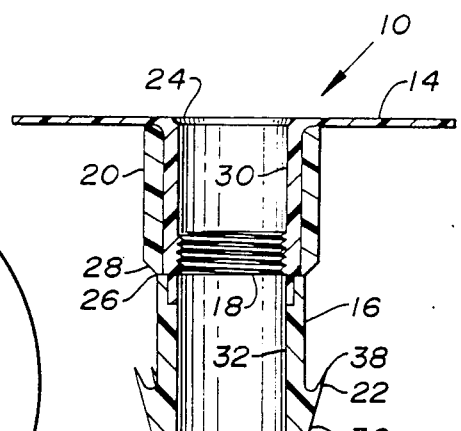
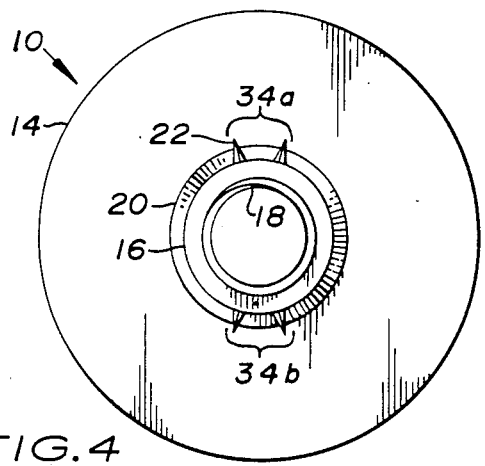

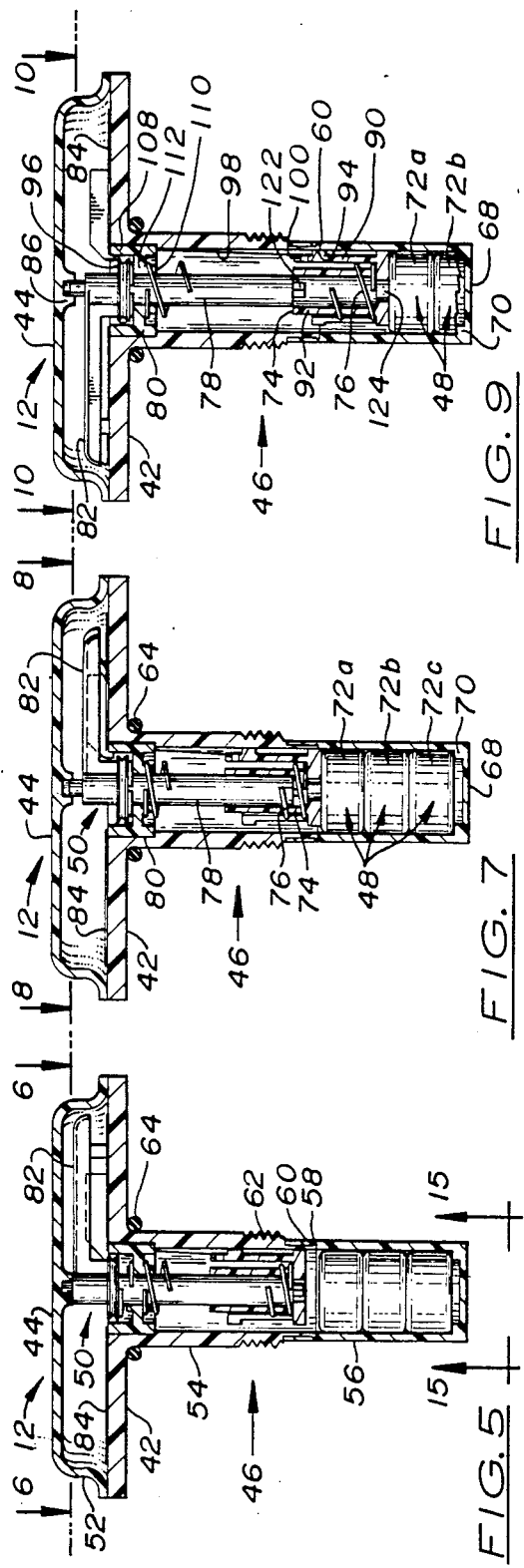

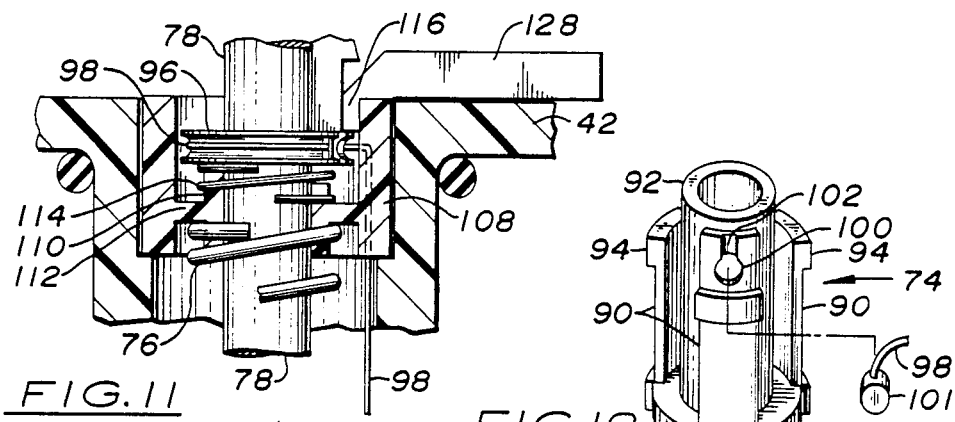
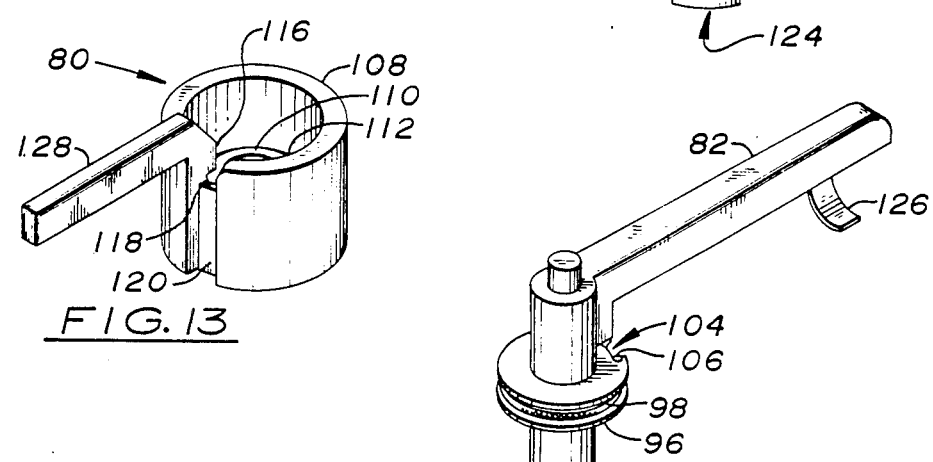
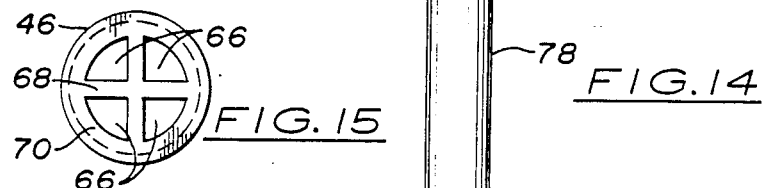
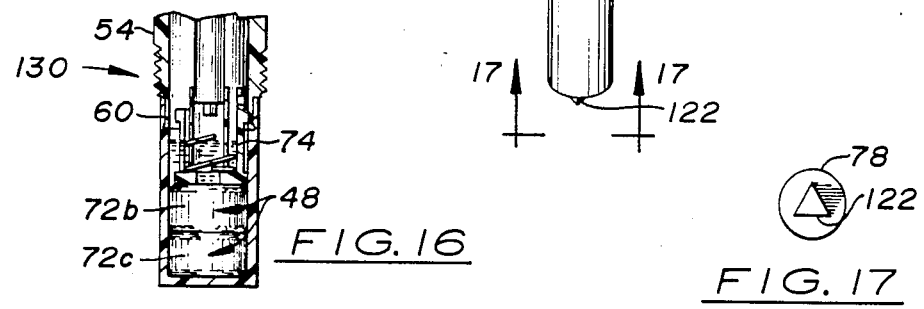

IMPLANTED ANCHOR AND INSERT WITH ANALOG DISPLAY

BACKGROUND OF THE INVENTION

1. Technical Field

This invention relates to medical devices for animals, and more particularly to an anchor implanted behind the animal's ear, and a medicant-dispensing or diagnostic insert with analog display for use therewith.

2. Description of the Prior Art

The care and raising of animals has always required devices for communicating an animal's condition to a human person, because of the vast communications gap between man and other species. Such devices can be separted into active devices such as conventional thermometers and sphygmomanometers which are applied only when the human is in immediate need of the information provided thereby, and passive devices which continuously provide information on the animal's condition in a form which is readily understood by a human. An example of one such passive temperature sensing device is found in Kelly et al. U.S. Pat. No. 4,083,364.

Kelly discloses a head-mounted retaining device and an associated binary state temperature indicating insert for detecting fever conditions in animals. The Kelly retainer is inserted through the animal's skin into the subcutaneous fascia behind the ear. The retainer has a flange underlying a flange of the insert, and a sleeve capable of radial expansion to cooperate with the flange of the retainer to hold the retainer in place.

Once the retainer has been implanted, the Kelly temperature sensing insert is inserted into the animal through the hollow sleeve of the retainer. The insert remains in its initial, unactivated state until it is activated by the presence of a fever condition in the animal. A fever condition, in which the temperature of the subcutaneous fascia surrounding the tube is elevated, melts a meltable element in the insert which allows a spring-powered piston to descend, uncovering a brightly covered surface portion of the insert and thereby signalling that the animal's temperature has crossed the threshold identified by the melting temperature of the selected meltable element. The binary-state Kelly insert operates in only two states: the initial unactivated state and the final, completely expanded state. The extent of the fever, i.e. the degree to which the animal's body temperature has risen, is not communicated by the device, and must subsequently be determined by other means such as a conventional thermometer.

SUMMARY OF THE INVENTION

The present invention resides in an anchor implanted in the subcutaneous fascia behind the animal's ear, and a diagnostic or medicant-dispensing insert with analog display used in cooperation with the anchor. The anchor comprises an anchor flange, a sleeve with internal threads, healing material and retaianing barbs. The anchor flange is a flat element positioned adjacent the animal's skin to prevent excessive penetration of the anchor into the animal. The sleeve is fixedly attached around the opening of the anchor flange and extends therefrom into the animal. The insert is be inserted through the sleeve of the anchor into the animal. The healing material is disposed around an upper portion of the sleeve, and is suitably compounded to promote healing of the tissues surrounding the incision through which the anchor and insert are inserted, and to aid growth of said tissues to the healing material to securely retain the anchor in the animal. The barbs depend upward and outward from the outer surface of the lower end of the sleeve, retaining the anchor in place in the animal until the healing process is completed.

The insert comprises an insert flange positioned adjacent the anchor flange, a tube fixedly attached around an opening of the insert flange, extending through the sleeve of the anchor and contacting the subcutaneous fascia of the animal, a medicant-containing, diagnostic or other material disposed in the lower end of the tube, and an analog indicator means. After insertion and subsequent activation, the medicant-containing material progressively dissolves to administer the medicant to the animal, while the diagnostic material progressively liquefies in response to a progressive diagnostic or other condition of interest in the animal such as an elevated, feverous body temperature. The analog indicator means produces a visible indication of the activation of the insert and a proportionate visual analog display of the progressive liquefaction or dissolution of the material within the tube, thereby visibly and precisely communicating to a human observer the extent of the diagnostic condition or the amount of medicant administered to the animal.

Other features and advantages of the present invention will become apparent from the following detailed description of a typical embodiment thereof, taken in conjunction with the accompanying drawings.

BRIEF DESCRIPTION OF THE DRAWINGS

FIG. 1 is a sectional view through the region behind the animal's ear, showing the anchor and a medicant-dispensing embodiment of the insert of the present invention.

FIG. 2 is a top plan view of the anchor of FIG. 1 showing the upper surface of the anchor flange.

FIG. 3 is a cross-sectional view of the anchor of FIG. 1 showing the sleeve, healing material, threads and barbs.

FIG. 4 is a bottom plan view of the anchor of FIG. 1 showing the arrangement of the barbs.

FIG. 5 is a cross-sectional view through the insert of FIG. 1, showing the insert in the initial, unactivated state.

FIG. 6 is a top plan view of the unactivated insert of FIG. 5 showing the display of the insert in the initial state.

FIG. 7 is a cross-sectional view through the insert of FIG. 1 showing the insert in the activated state immediately after activation.

FIG. 8 is a top plan view of the activated insert of FIG. 7 showing the display of the insert in the activated state immediately after activation.

FIG. 9 is a sectional view through the insert of FIG. 1 showing the insert in a partially expended state in which approximately 50% of a medicant-containing material has been administered to the animal.

FIG. 10 is a plan view of the partly expended insert of FIG. 9 showing the display of the insert in a partly expended state.

FIG. 11 is an enlarged detailed cross-sectional view of an upper portion of the indicator assembly of the insert in the activated state as shown in FIG. 7.

FIG. 12 is an isometric view of the piston of the insert of FIG. 1.

FIG. 13 is an isometric view of the cap of the insert of FIG. 1.

FIG. 14 is an isometric view of the shaft, the pulley, and the indicator arm and finger of the insert of FIG. 1.

FIG. 15 is a bottom plan view of the open-ended lower tube section of the medicant-dispensing insert of FIG. 1.

FIG. 16 is a cross-sectional view through the closed-ended lower tube section of a temperature-sensing embodiment of the insert of the present invention.

FIG. 17 is a bottom plan view of the shaft of FIG. 14, showing the triangular extension for resetting the indicator assembly.

DESCRIPTION OF THE PREFERRED EMBODIMENTS

The anchor

As shown in FIG. 1, the present invention comprises an anchor 10 implanted in the animal through an incision in a target region 2 located behind the animal's ear 4, and a medicant-dispensing or diagnostic insert 12 inserted through and held in place by the anchor 10. The target region 2, commonly known as the Kelly triangle, is bounded cranially by the posterior border of the conchal cartilage and caudally by the anterior border of the cleido-occipitalis muscle. The target region 2 comprises a substantially cylindrical volume greater than about one inch (2.5 cm) in diameter filled with soft moist tissue, and extends from the animal's skin 6 downward into the subcutaneous fascia 8 and fat. The target region 2 is considered adequate for the dispensation of medicants and superior for the diagnosis of the animal's condition. The temperature of the subcutaneous fascia in the target region 2 is about 1° F. (0.6° C.) lower than the animal's rectal temperature, and provides a reliable measure of the animal's body temperature. It is understood, however, that the device of the present invention can be used in other areas of the animal.

As seen in FIGS. 2-4, the anchor 10 comprises an anchor flange 14, a sleeve 16 having internal threads 18 for engaging the insert 12, healing material 20 for promoting healing of the incision through which the anchor is placed, and barbs 22 for retaining the anchor in the animal until the healing is completed. The anchor 10 and insert 12 of the present invention are particularly suited for use in cattle, hogs and other livestock. However it is understood that the anchor 10 and/or the insert 12 can be used in any animal having a suitable area in which the anchor or insert can be implanted.

The anchor flange 14 is a flat, substantially rigid annular element positioned against the animal's skin 6. The anchor flange 14 prevents excessive penetration of the anchor 10 into the animal and provides a stable support for the insert 12. A rectangular, laterally extending tab for permanent identification of the animal can be incorporated into the anchor flange 14 if desired. The anchor flange 14 additionally provides a secure means for affixing tags or other informationbearing elements to the animal between the anchor flange and the animal's skin 6. The outer periphery of the anchor flange 14 is sized to prevent the animal's hair from entering the inner opening of the anchor flange and causing infection, and from impairing the visibility of the insert 12. The inner diameter of the anchor flange 14 defines an opening therein through which the insert 12 is inserted into the sleeve 16 extending into the animal. A circular depression 24 around the circumference of the opening in the anchor flange 14 acts as a seat for an O-ring-type seal attached to the insert 12 to prevent hair, dirt and other contaminants from infecting the animal through the sleeve 16.

The sleeve 16 is a tubular element fixedly attached around the annular opening in the anchor flange 14, and extending downward into the subcutaneous fascia 8 of the target region 2. The internal threads 18 are disposed around the interior surface of the sleeve 16 slightly above the midpoint of the length of the sleeve, and comprise two or three turns of ⅜ inch—24 internal threads. As described below, the internal threads 18 of the anchor 10 engage corresponding external threads disposed around the outer surface of the insert 12.

The healing material 20 is suitably a known porous, bio-medical grade, linear, segmented aliphatic polyurethane elastomer, such as the product "Tekoflex" produced by Thermedics Incorporated of Woburn, Mass., which accommodates the healing of animal tissues. The healing material 20 is readily injection moldable and disposed around the outer surface of an upper portion of the sleeve 16. After the anchor 10 has been implanted in the animal, the healing material 20 encourages attachment of the skin 6 and subcutaneous fascia 8 thereto. When this healing is complete, the anchor 10 is effectively a part of the animal and cannot be removed without injury. The upper edge of the healing material 20 contacts the lower surface of the anchor flange 14 to prevent skin, hair, dirt and other contaminants from lodging between them. The healing material 20 extends downward from the anchor flange 14 about one-half the length of the sleeve 16. To prevent the healing material 20 from slipping along the outer surface of the sleeve 16, a shoulder 26 around the outer surface of the sleeve proximally engages a lower edge 28 of the healing material. The shoulder 26 is provided by suitably reducing the diameter of the outer surface of an upper section 30 of the sleeve 16 which is in contact with the healing material 20 so that the thickness of said upper sleeve section is about two-thirds the thickness of the remaining lower section 32 of the sleeve. The shoulder 26 is located at the transition between these upper and lower sleeve sections 30,32 and has a radial width about one-third the thickness of the lower sleeve section. To prevent damage to the healing material during implantation of the anchor 10, the outer peripheral portion of the lower edge 28 of the healing material 20 not in contact with the shoulder 26 is beveled at an angle of about 45° to provide a smooth transition between the healing material and the lower sleeve section 32.

The upper section 30 of the sleeve 16 is fixedly attached around the circumference of the opening in the anchor flange 14, and extends downward at least as far as the lower edge of the healing material 20. The anchor flange 14 and the upper sleeve section 30 are preferably formed as an integral unit, as by injection molding of a suitable plastic. The inner diameters of the upper and lower sleeve sections 30,32 are the same to aid insertion of the insert 12. The lower sleeve section 32, having a larger outer diameter than the upper sleeve section 26 as described above, is joined to the upper sleeve section after the healing material 20 has been attached around the outer surface of the upper sleeve section. The upper and lower sleeve sections 30,32 are joined in sleeved fashion by sliding a thinner lower end of the upper sleeve section 30 into a thinner upper end of the lower sleeve section 32. The lower end of the upper sleeve section 30 is thinned by reducing the outer diameter thereof, while the upper end of the lower sleeve section 32 is thinned by increasing the inner diameter thereof. It should be noted that the entire anchor 10 may be molded as a single unit, such as by injection molding. The healing material 20 may be molded in place around the upper sleeve section 30.

While the healing process is underway, the barbs 22 retain the anchor 10 in the animal. Once the incision has completely healed around the healing material 20, the barbs 22 become superfluous. The four barbs 22 are arranged circumferentially around the sleeve 16 in two pairs 34a,34b, each comprising two barbs separated by an angle of about 30° around the circumference of the sleeve. The pairs 34a,34b themselves are positioned opposite each other around the sleeve 16, giving the four barbs 22 an arrangement resembling a flattened "X". The arrangement of the barbs 22 into two pairs 34a,34b forming a flattened "X" allows the barbs to be oriented parallel to the length of the incision when the anchor 10 is implanted into the animal. Implantation can be aided by insertion in the incision of flexible blade retractors to hold the incision open while implanting the anchor. Implantation can be further aided by use of means for preventing foreign substances from migrating through the incision into the animal, such as the foam-like material disclosed in Kelly et al. U.S. Pat. No. 4,245,652. Each barb 22 has a thicker base 36 fixedly attached to the lower sleeve section 32, and a distal portion 38 extending upward and outward from the base and terminating in a sharp point. An upper portion of the base 36 is broadened to provide a firm support for the barb and to increase barb's resistance to removal of the anchor 10. The base 36 of the barb 22 is narrowed and flattened toward the lower end of the lower sleeve section 32, and at the extreme lower end thereof is flush therewith. The distal portion 38 extends radially upward and outward from the base 36 at an angle of about 30° to the longitudinal axis of the sleeve 16, and is somewhat shorter than the length of the base along said axis. Alternative means for retaining the anchor 10 in the animal, both before and after healing of the incision, are possible and are contemplated. However at present the combination of the barbs 22 for temporary retention and the healing material 20 for permanent retention of the anchor 10 in the animal is preferred.

It is understood that the anchor 10 of the present invention can be used with inserts other than those described herein. For example, the anchor 10 can be used with a temperature sensing insert of the type shown in Kelly U.S. Pat. No. 4,083,364 at FIG. 14 with external threads on the insert stem 29 thereof, to be received in internal threads 18 of the anchor 10 of the present invention. In particular, the anchor 10 is well suited to securely retain and position an insert having remote transmitting means for communicating the animal's status to a receiving device located away from the animal, such as a radio signal receiver and decoder.

The medicant-dispensing embodiment of the insert

As best seen in FIGS. 5-10, the insert 12 comprises an insert flange 42 and a transparent cover 44, a tube 46 extending therefrom through the sleeve 16 of the anchor 10 into the animal, a diagnostic or medicant-containing material 48 disposed within the tube, and an analog indicator assembly 50. FIGS. 2-10 are drawn to substantially the same scale, showing the anchor and insert at about twice actual size.

As best seen in FIG. 5, the insert flange 42 is a flat, substantially rigid, annular element positioned adjacent to the exposed upper surface of the anchor flange 14. The cover 44 is a circular, substantially rigid, dished transparent element attached to a peripheral portion of the upper surface of the insert flange 42. A relatively deep lip 52 around the circumference of the cover 44 raises the flat surface if the cover above the upper surface of the insert flange 42. The enclosed space between the insert flange 42 and the cover 44 contains a visible portion of the analog indicator assembly 50.

The tube 46 is an elongated tubular element extending perpendicularly from the insert flange 42 through the sleeve 16 of the anchor 10 into the animal. The tube 46 is formed from an upper tube section 54 fixedly attached to the insert flange 42, and a lower tube section 56 removably attached to the upper tube section. The upper and lower tube sections 54, 56 are joined in sleeved fashion by sliding a thinner lower end of the upper tube section 54 into a thinner upper end of the lower tube section 56. The lower end of the upper tube section 54 is thinned by reducing the outer diameter thereof, while the upper end of the lower tube section 56 is thinned by increasing the inner diameter thereof. A channel 58 around the inner surface of the upper end of the lower tube section 56 and an interfitting ridge 60 around the outer surface of the lower end of the upper tube section 54 provide a positive yet detachable connection between the upper and lower tube sections.

The division of the tube 46 into an upper tube section 54 and a removable lower tube section 56 allows the use of interchangeable lower tube sections, each specifically adapted to a particular medicant-containing, diagnostic or other material 48. Additionally, the removable lower tube section 56 allows the insert flange 42, upper tube section 54 and enclosed analog indicator assembly 50 to be reused by simply placing the lower tube section 56 and the material 48, and re-initializing the analog indicator assembly as described below.

The insert 12 is removably attached to the anchor 10 by conventional external threads 62 disposed around the outer surface of the upper tube section 54, and threadably engaging the corresponding internal threads 18 of the anchor 10. The external threads 62 of the insert 12 are disposed around the outer surface of the tube 46 slightly above the midpoint of the length of the tube, and comprise two or three turns of ⅜ inch—24 external threads. Before the anchor 10 is implanted in the animal, the tube 46 of the insert 12 is threaded through the sleeve 16 of the anchor until the insert flange 42 is adjacent to the anchor flange 14. A conventional O-ring seal 64 encircling the upper end of the tube 46 adjacent the insert flange 42 and seated in the circular depression 24 around the perimeter of the opening of the anchor flange 14 ensures that no foreign matter can enter into the animal between the insert and anchor flanges when the insert 12 is in place. Alternatively, any gap between the insert flange 42 and the anchor flange 14 could be sealed by means of a relatively thin flexible annular ring encircling the tube 46 and contacting the anchor flange or the inner surface of the anchor sleeve 16.

In a medicant-dispensing embodiment of the insert 12, the lower end of the lower tube section 56 is pierced by a plurality of tube openings 66 which allow the animal's bodily fluids and moist tissue to contact the medicant-containing material 48. As best seen in FIG. 15, these openings 66 comprise the spaces between a cross-shaped support 68 at the open lower end of the tube 46. A sealing lip 70 extending around the inner circumference of the open lower end of the tube 46 prevents the animal's bodily fluids from passing upward into the tube beyond the material 48, reducing the possibility of faulty operation of the insert 12.

In the medicant-dispensing embodiment of the insert 12, the material 48 is an appropriately compounded mixture of a carrier material which dissolves when in contact with the animal's bodily fluids and moist tissue, and a selected medicant mixed with the carrier material and administered to the animal as the carrier material progressively dissolves. The medicant can be a dietary supplement such as vitamin A, or a therapeutic substance such as any of several known antibiotics. As seen in FIG. 7, the material 48 is preferably formed into a plurality of substantially solid cylindrical pellets 72a,72b,72c having an exterior diameter sized to allow longitudinal movement thereof within the tube 46 while minimizing the passage of the animal's bodily fluids beyond the pellets. The pellets 72a,72b,72c are thus readily inserted into and can readily slide within the tube 46. A lower end of the lowest of the pellets 72a,72b,72c is positioned in contact with the material support 68 and the sealing lip 70. Alternatively, a capsule-like element containing the medicant or like material in essentially liquid form may be used, in which case the liquid is released from the capsule by suitable means for allowing the liquid to escape, such as thermal rupture of the capsule.

The analog indicator assembly 50 displays the remaining quantity of material 48 in the tube 46. Thus the medicant-dispensing embodiment of the insert 12 displays the amount of the medicant administered to the animal. As best seen in FIG. 9, the indicator assembly 50 includes analog display means a piston 74 disposed within the tube 46 and a piston spring 76 positioned immediately upward from the piston toward the insert flange 42 to force the piston towards the lower end of the tube 46. The spring-powered piston 74 progressively forces the pellets 72a,72b,72c toward the lower end of the tube 46, keeping the lowest pellet in constant firm contact with the material support 68 and the sealing lip 70.

The analog display which is a principal feature of the present invention is produced by the analog display means, which preferably comprises a shaft 78 extending through a cap 80 in the upper end of the tube 46, a radial indicator arm 82 located below the transparent cover 44 and rotated by the shaft, and a flexible, highly reflective sheet 84 gathered up from the exposed upper surface of the insert flange 42 by the rotating indicator arm. When the insert 12 is in the initial, unactivated state as shown in FIGS. 5 and 6, the indicator arm 82 is in its initial position and the reflective sheet 84 covers the entire exposed upper surface of the insert flange 42. As shown in FIGS. 7 and 8, immediately after the insert is activated the radial indicator arm 82 is rotated a given amount, gathering a relatively small portion of the reflective sheet 84 up from the brightly colored upper surface of the insert flange 42 to indicate that the insert 12 is in the activated state. As shown in FIGS. 9 and 10, as the medicant-containing material 48 is dispensed the indicator arm 82 is progressively rotated, gathering the reflective sheet 84 from the insert flange 42 and exposing the brightly colored upper surface thereof to view. The remaining visible portion of the reflective sheet 84 is thus proportionate to the amount of the material 48 remaining in the tube 46.

To provide an analog display, the rotation of the shaft 78 must be in proportional response to the downward movement of the piston 74 toward the lower end of the tube 46 as the material 48 dissolves. As best seen in FIG. 9, the rigid cylindrical shaft 78 is positioned coaxially with the longitudinal axis of the tube 46, and extends from a lower end located within the tube upwardly through the cap 80 toward the cover 44. A reduced diameter upper end of the shaft 78 is supported in the cylindrical hole of a shaft support 86 fixedly attached to an interior surface of the cover 44. The diameter of the shaft 78 is approximately one-third the interior diameter of the tube 46. The piston 74 and pellets 72a,72b,72c are disposed between the lower end of the shaft 78 and the material support 68. As presently preferred, the lower end of the shaft 78 is approximately coplanar with the ridge 60 of the upper tube section 54.

As best seen in the detailed isometric view of FIG. 12, the piston 74 comprises a piston head 88, three piston guides 90, and a shaft guide 92. The rigid, flat, circular piston head 88 is located at a lower end of the piston 74, adjacent to or in contact with the uppermost pellet 72a depending on the unactivated or activated state of the insert 12. A hole is provided in the center of the piston head 88 for use when the indicator assembly 50 is reset, as described below. Each piston guide 90 is fixedly attached to the piston head 88, and extends therefrom perpendicularly upwardly to a distal end nearer the insert flange 42. Each piston guide 90 comprises a longitudinal segment of a tubular section of appropriate length, subtending an angle of 45° and having an outer diameter equal to the diameter of the piston head 88. A guide leg 94 extends perpendicularly from the distal end of each piston guide 90 outwardly to the inner surface of the tube 66, maintaining the alignment of the piston 74 within the tube. The rigid, tubular shaft guide 92 extends perpendicularly from the center of the piston head 88 upwardly toward the insert flange 42 to maintain the alignment of the piston 74 against the shaft 78.

To provide an analog display, the rotation of the shaft 78 must be in proportionate response to the downward movement of the piston 74 toward the lower end of the tube 46. Referring again to FIG. 9, the shaft 78 is rotated by a pulley 96 fixedly attached coaxially thereto, and a string 98 having a first end attached to the piston 74 and a second end encircling and terminally attached to the pulley 96. As the piston 74 descends toward the lower end of the tube 46, the string 98 attached thereto is unreeled from the pulley 96, causing the pulley and the shaft 78 to rotate together.

The first end of the string 98 is attached to the piston 74 by means of a string anchor 100 which is best seen in FIG. 12. The string anchor 100 is fixedly attached to the distal end of one of the shaft guides 92. The string anchor 100 is a flat, substantially square element fixedly attached along one edge to the shaft guide 92 and extending upwardly therefrom. A cylindrical hole extends through the flat string anchor 100 perpendicularly to the faces thereof. A rectangular channel 102 extends upwardly along the center of the outer face of the string anchor 100 between the cylindrical hole and the upper edge of the string anchor. A solid cylindrical plug fixedly attached to the first end of the string 98 is inserted into the cylindrical hole of the string anchor 100, with the string extending upwardly through the rectangular channel 102 toward the pulley 96.

The circular pulley 96 fixedly attached to the shaft 78 is located within the cap 80, and has an effective outer circumference substantially equal to the distance travelled by the piston 74. As best seen in the detailed isometric view of FIG. 14, the pulley 96 contains a notch 104 extending radially inwardly from the perimeter of the pulley approximately one-half the distance to the center of the pulley and subtending an angle of approximately 30°. The notch 104 extends from an upper flat surface of the pulley 96 nearest to the insert flange 42 downward into the pulley about one-half the thickness thereof. A groove around the perimeter of the pulley 96 receives the string 98, allowing the string to encircle the pulley without danger of slip-page. The groove of the pulley 96 is of circular cross-section and is only deep enough to receive a single thickness of the string, since the pulley and the shaft 78 are only rotated one revolution during the operation of the insert 12. A semi-cylindrical depression 106 in the vertical side surface of the notch 104 is provided to anchor the second end of the string to the pulley 96. The depression 106 in the notch 104 is oriented with the centerline of the depression coplanar with said side surface of the notch and intersecting the groove of the pulley. The string 98 is anchored to the pulley 96 by placing a solid cylindrical plug fixedly attached to the second end of the string into the semi-cylindrical depression 106 in the pulley, and wrapping the string around the groove of the pulley. The plug is substantially the same as the plug anchoring the first end of the string 98 to the string anchor 100 of the piston 74.

The cap 80 is positioned within the upper end of the tube 46, and surrounds the perimeter and lower side of the pulley 96. As best seen in FIGS. 11 and 13, the cap 80 comprises a tubular outer cap wall 108 and a concentric tubular inner cap wall 110 rigidly connected by a flat annular septum 112 positioned about midway between the upper and lower edges of the inner cap wall. The outer cap wall 108 has an outer diameter equal to the inenr diameter of the tube 46 and fits tightly against the inner surface thereof. The upper edge of the outer cap wall 108 is coplanar with the upper surface of the insert flange 42. The inner cap wall 110 encircles the shaft 74, having an inner diameter slightly larger than the diameter of the shaft to allow free rotation thereof.

The upper edge of the inner cap wall 110 is spaced downward from the upper edge of the outer cap wall 108 by a distance approximately equal to twice the thickness of the pulley 96. A first gap between the outer and inner cap walls 108,110 extends from the lower edge of the inner cap wall upward to the septum 112. This circular gap receives an upper end of the piston spring 76, aligning the piston spring within the tube 46 and providing a firm support for said spring. A second gap between the outer and inner cap walls 108,110 extends from the upper edge of the inner cap wall downward to the septum 112. This second circular gap receives and supports the lower end of a cap spring 114, aligning the cap spring within the cap 80 and providing a firm support for said spring. The flat annular septum 112 is positioned approximately midway between the upper and lower edges of the inner cap wall 110.

The cap 80 includes a locking tab 116 to protect the insert 12 from premature activation. The locking tab 116 extends from the outer cap wall 108 radially inward a sufficient distance to engage a radial edge of the notch 104 of the pulley 96, and extends downward from the upper edge of the outer cap wall 108 for a distance approximately equal to the thickness of the pulley. When the insert 12 is in the initial, unactivated state, the locking tab 116 fits within the notch 104 of the pulley 96, thereby preventing rotation of the pulley and the shaft 78 fixedly attached thereto. The pulley 96 is forced against the locking tab 116 by the cap spring 114 positioned between the pulley and the cap septum 112. The insert 12 is activated by applying a firm downward force to the center of the cover 44 above the shaft support 86, depressing the flexible cover and moving the shaft 78 downward against the force of the cap spring 114. The pulley 96, being fixedly attached to the shaft 78, is moved downward as well, disengaging the notch 104 from locking tab 116. A gap between the lower surface of the piston head 88 and the upper surface of the uppermost pellet 72a permits the piston 74 to move downward with the shaft 78 when the insert 12 is activated.

Slot 118 and channel 120 in the outer cap wall 108 permit the string 98 to freely pass between the pulley 96 enclosed within the cap 80 and the piston 74 below the cap. The slot 118 is an opening in the outer cap wall 108 adjacent the locking tab 116 and extending downward from the upper edge of the outer cap wall about one-third distance to the lower edge thereof. An upper portion of the vertical edge of the slot 118 opposite the side of the locking tab 116 is rounded to create a smooth transition between said vertical edge of the slot 118 and the upper edge of the outer cap wall 108, preventing damage to the string 98 and aiding free movement thereof. The channel 120 extends from the lower edge of the slot 118 downward to the lower edge of the outer cap wall, allowing the string 98 to move freely between the cap 80 and the inner surface of the tube 46.

As best seen in FIGS. 14 and 17, a shaft extension 122 at the lower end of the shaft 78 allows the indicator assembly 50 to be reset so that the insert 12 can be reused. The shaft extension 122 has a triangular cross-section perpendicular to the longitudinal axis of the shaft 78, and extends from the lower end of the shaft downward for a small predetermined distance. A central hole 124 in the center of the piston head 88 provides access to the shaft extension 122. The use of a spiral slot, a piston with matching protruberances, and a suitably keyed vertical shaft to rotate the indicator arm has been found to be a reasonable alternative to the preferred embodiment in some applications.

The insert 12 is prepared for reuse as follows. When the insert 12 is fully expended and the piston 74 is at the Lower end of the tube 46, the insert is removed from the animal and the lower tube section 56 is removed from the upper tube section 54 to expose the piston 74. A tool (not shown) having a triangular socket sized to accept the triangular shaft extension 122 is inserted through the central opening 124 in the piston head 88 until the socket accepts and engages the shaft extension. The piston 74 is manually forced upward against the force of the piston spring 76 toward its initial position, and the tool is simultaneously rotated to rotate the shaft 78, winding the string 98 back onto the pulley 96 and rotating the indicator arm 82 counterclockwise to return the reflective sheet 84 to its original position covering the upper surface of the brightly covered insert flange 42. When the piston 74 is completely retracted, the notch 104 of the pulley 96 reengages the locking tab 116 of the cap 80, locking the pulley in position and preventing movement of the piston 74 back toward the lower end of the tube 46. The pulley 96 is held locked against the locking tab 116 by the upward force of the cap spring 114. When assembled substantially as described above, the shaft 78, piston 74, cap 80 and pulley 96, together with the piston spring 76 and the cap spring 114, form a self-contained freestanding unit which can be readily inserted through the opening of the insert flange 42 into the tube 46. A lower tube section 56 containing fresh material 48 is prepared and attached to the upper tube section 54 by the interfitting channel 58 and ridge 60 of the lower and upper tube sections.

The indicator arm 82 and the reflective sheet 84 are located within the space enclosed by the insert flange 42 and the transparent cover 44. The indicator arm 82 is fixedly attached to an upper portion of the shaft 78 immediately below the shaft support 86 of the cover 44, and extends radially from the shaft 78 toward the perimeter of the insert flange, terminating at a distal end separated from the peripheral lip 52 of the cover 44 by a predetermined small distance. The indicator arm 82 has an inverted L-shaped cross-section oriented with a vertical element extending upwardly beginning at a small distance above the insert flange 42, and a horizontal element depending perpendicularly from an upper edge of said vertical element. The horizontal element of the distal end of the indicator arm 82 is rounded downward toward the insert flange 42, ensuring adequate clearance between the indicator arm and the lip 52 of the cover 14.

The thin, flexible, annular reflective sheet 84 is in contact with the upper surface of the flange 42 and is fixedly attached to the indicator arm 82 on the clockwise vertical face thereof. The other end of the reflective sheet 84 may be fixedly attached to the upper surface of the insert flange 42 immediately adjacent the counterclockwise face of the indicator arm 82. The outer radius of the reflective sheet 84 is approximately equal to the radius of the indicator arm 82, while the inner diameter of the sheet is approximately equal to the outer diameter of the cap 80. A thin elongated flexible finger 126 depends perpendicularly from the lower edge of the vertical element of the indicator arm 82 downward to a distal end positioned between the insert flange 42 and the reflective sheet 84. The finger 126 gathers the reflective sheet up from the exposed upper surface of the insert flange 42 as the indicator arm 82 is rotated by the shaft 78 in response to the spring-powered piston being forced toward the lower end of the tube 46. As the reflective sheet 84 is gathered up by the indicator arm 82, the brightly colored upper surface of the insert flange 42 is exposed to view. The amount of medicant-containing material 48 administered to the animal can be readily determined by observation of the portion of the brightly colored upper surface of the insert flange 42 exposed to view. It is understood that a similar analog device could be constructed utilizing only an indicator arm visible against the upper surface of the insert flange. Such a device is considered inferior to the insert 12 of the present invention, in that the display would not be visible from as great a distance as the display produced by the reflective sheet 84 contrasted against the brightly colored upper surface of the insert flange 42.

A stop bar 128 positively prevents the indicator arm 82 from displacing the reflective sheet 84 along the surface of the insert flange 42 past the initial starting point thereof and producing an ambiguous display. The stop bar 128 comprises a rectangular element located within the enclosed space between the insert flange 42 and the cover 44. The stop bar 128 extends from a central end fixedly attached to the upper edge of the outer cap wall 108 radially toward the perimeter of the insert flange 42, and terminates at a point approximately one-half the distance to said perimeter of the insert flange. A lower edge of the stop bar 128 in contact with the upper surface of the insert flange 42 prevents the reflective sheet 84 from moving along the upper surface of the insert flange as it is gathered up therefrom by the finger 126 of the rotating indicator arm 82. When the insert 12 is completely expended and the indicator arm is in its final position, the reflective sheet is bunched up between the indicator arm and the stop bar 128. The stop bar 128 extends vertically a sufficient distance upward from the insert flange 42 to engage the vertical element of the inverted L-shaped indicator arm 82 when the arm and the stop bar are adjacent each other. The stop bar 128 is suitably dimensioned to fit underneath the horizontal element of the inverted L-shaped indicator arm 82 when the insert 12 is in the initial, unactivated state and the indicator arm 82 is superimposed over the stop bar, and to provide sufficient clearance between the stop bar and the indicator arm to allow the indicator arm to be depressed when the insert is activated.

The diagnostic embodiment of the insert

The insert 12 can be used for diagnostic purposes instead of for the administration of medicants simply be substituting a closed-ended diagnostic embodiment of the lower tube section 130, shown in cross-sectional view in FIG. 16, for the open-ended lower tube section 56 used to dispense medicant-containing materials, and placing a selected liquefying diagnostic material therein. The insert flange 42 and cover 44, upper tube section 54 and indicator assembly 50 can be used in the diagnostic embodiment of the insert 12 without modification.

The diagnostic lower tube section 130 is closed-ended, having no tube openings between the interior and exterior of the tube 46. The closed-ended lower tube section 130 allows the use of a wider range of diagnostic materials 48 in the insert 12 than would be possible if the medicant-dispensing open-ended lower tube section 56 shown in FIGS. 5–10 and 15 were employed.

A useful application of the diagnostic embodiment of the insert 12 provides an analog display of the animal's body temperature by using multiple temperature-sensitive pellets $72a, 72b, 72c$, each pellet liquefying at a different pre-selected temperature. Pellets or capsules having liquefaction temperatures between 36° C. and 44° C. can be produced by appropriate compounding of substantially pure N-eicosane ($C_{20}H_{42}$) which melts at 36° C., and n-docosane ($C_{22}H_{46}$) which melts at 44° C. N-docosane and n-eicosane are waxy materials which are not toxic to the types of animals in which the insert 12 of the present invention is used.

For example, if the animal's normal body temperature is 99° F. (37° C.), then pellets $72a, 72b, 72c$ having respective liquefaction temperatures of 100° F. (38° C.), 102° F. (39° C.) and 104° F. (40° C.) might be disposed within the insert 12. After activation of the insert 12 and while the animal's temperature remained within a range of normal fluctuation below 100° F. (38° C.), the visible display of only a relatively small portion of the brightly-colored upper surface of the insert flange 42 would readily communicate both the animal's normal condition and the activated condition of the insert 12 to the human observer. When the threshold of 100° F. (38° C.) was crossed, suggesting that the animal was suffering from a mild fever, the pellet 72a having that liquefaction temperature would liquefy and allow the piston 74 to descend about one-third of the distance from its activated position to the closed lower end of the tube 46, causing the indicator assembly 50 to rotate the indicator arm 82 a proportionate amount, gathering one-third of the remaining portion of the reflective sheet 84 up from the insert flange 42 and exposing that portion of the brightly colored insert flange to view. Above 102° F. (39° C.) the second pellet 72b would liquefy, the piston 74 would descend again, and more than two-thirds of the insert flange 42 would be exposed to signal the presence of a significant fever. Above 104° F. (40° C.) the last pellet 72c would liquefy and the entire brightly colored insert flange 42 would be exposed, signaling a dangerous fever requiring immediate attention.

It is contemplated that other diagnostic conditions can be displayed using the insert 12 of the present invention simply by fabricating appropriate liquefying pellets 72a, 72b, 72c of material 48 responsive to the diagnostic condition of interest.

It will be appreciated that, although specific embodiments of the invention have been described herein for purposes of illustration, various modifications may be made without departing from the spirit and scope of the invention. Accordingly, the scope of the invention is not limited except as by the following claims.

What is claimed is:

1. A diagnostic or medicant dispensing assembly for animals, comprising:
    (a) an anchor having
        (i) a flat annular anchor flange positionable adjacent the surface of the animal's skin,
        (ii) a sleeve fixedly attached around an opening of the anchor flange, and extending therefrom into the animal, and
        (iii) retention means for retaining the anchor in the animal; and
    (b) an insert having
        (i) a substantially flat insert flange,
        (ii) a tube fixedly attached around an opening of the insert flange, and extending therefrom through the sleeve of the anchor into the animal,
        (iii) a substantially solid material disposed with the tube, said material progressively dissolving to administer a medicant contained therein to the animal, or progressively liquefying in response to a diagnostic or any other condition or interest in the animal, and
        (iv) analog indicator means for producing a proportionate visual analog display of the extent of dissolution or liquefaction of the material within the tube.

2. The assembly of claim 1, wherein the anchor is implanted in a region behind the animal's ear bounded cranially by the posterior border of the conchal cartilage and caudally by the anterior border of the caleido-occipitalis muscle.

3. The assembly of claim 1, wherein the retention means includes means for aiding growth of the animal's tissues and attachment thereof to the anchor.

4. The assembly of claim 3, wherein the growth-aiding means comprises a healing material disposed around an upper portion of the sleeve, said healing material aiding healing of the animal's tissues after implantation of the anchor.

5. The assembly of claim 1, wherein the retention means includes a plurality of barbs projecting upwardly from around the sleeve.

6. The assembly of claim 1 or claim 2, wherein an opening extends through a lower end of the tube, and wherein a medicant-containing material is disposed within said lower end of the tube, said medicant-containing material progressively dissolving and administering the medicant contained therein to the animal by interaction with moist tissue of the animal.

7. The assembly of claim 1 or claim 2, wherein a plurality of relatively solid pellets of a temperature-sensitive diagnostic material is disposed within a lower end of the tube, each such pellet liquefying when the temperature of the pellet reaches a pre-selected liquefaction temperature, such liquefaction temperature being different than the liquefaction temperature of another of the pellets.

8. The assembly of claim 1 wherein the analog indicator means comprises:
    (a) a piston located within the tube above the material disposed therein,
    (b) a piston spring forcing the piston toward the lower end of the tube,
    (c) a shaft positioned coaxially within the longitudinal axis of the tube,
    (d) rotation means for rotating the shaft about its longitudinal axis in proportionate response to movement of the piston toward the lower end of the tube, and
    (e) analog display means for producing a proportionate, analog visual display of the extent of rotation of the shaft.

9. The assembly of claim 8 wherein the rotation means comprises:
    (a) a pulley fixedly attached coaxially to the shaft above the piston spring; and
    (b) a string attached at a first end to the pulley, and extending therefrom around a portion of the circumference of the pulley and thence to an opposite second end of the string attached to the piston.

10. The assembly of claim 8 or 9, wherein the analog display means includes a visible indicator arm fixedly attached to an upper end of the shaft and rotated thereby.

11. The assembly of claim 10 wherein the analog display means further includes:
    (a) a flat, highly visible sheet disposed adjacent an upper surface of the insert flange, and
    (b) a flexible finger attached to the indicator arm, having a distal end progressively gathering up the visible sheet from the insert flange when the shaft and indicator arm are rotated.

12. The assembly of claim 9 further including:
    (a) a cap positioned between the piston spring and the pulley, said cap including a locking tab engaging an interfitting notch in the pulley when the insert is unactivated, thereby preventing the pulley and shaft from premature rotation; and
    (b) a cap spring positioned between the cap and the pulley and forcing the pulley against the locking tab, wherein the device is activated by axially translating the shaft toward the lower end of the tube against the force of the cap spring, and thereby disengaging the notch of the pulley from the locking tab and freeing the pulley and shaft to rotate.

13. An anchor to retain and position an insert having an insert flange and a tube extending into an animal, said anchor comprising:
(a) a flat anchor flange positionable adjacent the surface of the animal's skin,
(b) a sleeve fixedly attached around an opening of the anchor flange and extending therefrom into the animal,
(c) healing material disposed on said sleeve for aiding healing of the animal's tissue and growth of said tissue to the healing material,
(d) a plurality of barbs disposed on said sleeve for retaining the anchor in the animal, and
(e) connection means for removably attaching the tube of the insert to the sleeve of the anchor.

14. The anchor of claim 13 wherein the healing material comprises a bio-medical grade, linear, segmented, aliphatic polyurethane elastomer.

15. The anchor of claim 13 or claim 14 wherein four upward projecting barbs are disposed around a lower portion of the sleeve, said barbs arranged in two pairs of opposed barbs with each pair separated from the other pair at an angle of about 30°.

16. The anchor of claim 13 further including sealing means for preventing the entry of contaminants into a space between the sleeve of the anchor and the tube of the insert.

17. In combination with an insert having an insert flange and a tube extending into an animal, an anchor for positioning and retaining the insert in the animal, said anchor comprising:
(a) a flat anchor flange positionable between the surface of the animal's skin and the insert flange,
(b) a sleeve fixedly attached around an opening of the anchor flange and extending therefrom into the animal, said sleeve substantially surrounding the tube of the insert,
(c) healing material disposed around an upper portion of the sleeve, said healing material aiding healing of the animal's tissue and growth of said tissue to the healing material,
(d) at least four upward projecting barbs disposed around a lower portion of the sleeve, four of said barbs being arranged in two pairs of two opposed barbs with each such pair separated from the other pair by about 30°,
(e) internal thread means disposed around the inner surface of the sleeve for removably attaching the insert to the anchor, and
(f) sealing means for preventing the entry of contaminants between the sleeve and the tube of the insert.

18. An insert for use with a retainer extending through the skin into the subcutaneous fascia of the animal, said insert comprising:
(a) a substantially flat insert flange,
(b) a tube fixedly attached around an opening of the insert flange, and extending therefrom through the retainer into the animal,
(c) a substantially solid material disposed within the tube, said material progressively dissolving and administering a medicant contained therein to the animal, or progressively liquefying in response to a diagnostic or any other condition or interest in the animal, and
(d) analog indicator means for producing a proportionate analog visual display of the extend of dissolution or liquefaction of the material within the tube.

19. The insert of claim 18 wherein one or more openings extend through a lower end of the tube, and wherein one or more pellets of a medicant-containing material are disposed within said lower end of the tube, said pellet(s) progressively dissolving and administering the medicant contained therein to the animal by interaction with moist tissue of the animal.

20. The insert of claim 19 further including a sealing lip disposed around the inner surface of the lower end of the tube to prevent passage of the animal's bodily fluids upwardly beyond the lowest pellet in the tube.

21. The insert of claim 18 wherein a plurality of temperature sensitive pellets are disposed within a lower end of the tube, each such pellet liquefying when the temperature of the pellet reaches a pre-selected liquefaction temperature which is different than the liquefaction temperature of another of the pellets.

22. The insert of claim 18 wherein the analog indicator means comprises:
(a) a piston positioned within the tube above the material disposed therein,
(b) piston energizing means for forcing the piston toward the lower end of the tube,
(c) a shaft positioned coaxially within the longitudinal axis of the tube,
(d) rotation means for rotating the shaft about its longitudinal axis in proportionate response to movement of the piston toward the material, and
(e) analog display means for producing a proportinate, visual analog display of the extent of rotation of the shaft.

23. The insert of claim 22 wherein the piston energizing means comprises a compressed spring.

24. The insert of claim 22 or claim 23, wherein the rotation means comprises:
(a) a pulley fixedly attached coaxially to the shaft above the piston spring, and
(b) a string attached at a first end to the pulley, and extending therefrom around a portion of the circumference of the pulley and thence to an opposite second end of the string attached to the piston, wherein movement of the piston toward the material disposed within the tube causes the string to unreel from the pulley, thereby rotating the shaft.

25. The insert of claim 24 further including
(a) a cap positioned between the spring and the pulley, said cap including a locking tab engaging an interfitting notch in the pulley when the insert is unactivated; and
(b) a cap spring positioned between the cap and the pulley and forcing the pulley against the locking tab, wherein the insert is activated by translating the shaft toward the lower end of the tube against the force of the cap spring, thereby disengaging the notch of the pulley from the locking tab.

26. The insert of claim 22 or claim 23 wherein the analog display means includes a visible indicator arm fixedly attached to an upper end of the shaft.

27. The insert of claim 26, wherein the analog display means further includes:
(a) a flat, highly visible sheet disposed adjacent an upper surface of the insert flange, and
(b) a flexible finger attached to the indicator arm, having a distal end progressively gathering up the visible sheet from the insert flange when the shaft and indicator arm are rotated.

28. The insert of claim 27 further including stop means for preventing the indicator arm from passing said stop means and preventing the sheet from moving across the flange.

29. The insert of claim 26, wherein the activation of the insert is indicated by a relatively small rotation of the indicator arm.

30. The insert of claim 22 further including a transparent cover covering the analog display means.

31. The insert of claim 18 or claim 22 wherein the analog indicator means further produces a visible indication of the activation of the insert.

32. In combination with a retainer inserted into an animal, said retainer having a substantially flat anchor flange, a sleeve, means for retaining the retainer in the animal, and connection means for removably attaching an insert to said retainer, an insert with analog display comprising:
   (a) a substantially flat annular insert flange;
   (b) a tube fixedly attached around an opening of the isert flange, and extending therefrom through the retainer into the animal;
   (c) a material disposed within a lower end of the tube, said material progressively dissolving and thereby administering a medicant contained therein to the animal, or progressively liquefying in response to a diagnostic or other condition of interest in the animal;
   (d) a piston positioned within the tube above the material disposed therein;
   (e) a piston spring positioned immediately upward from the piston toward the insert flange for forcing the piston toward the lower end of the tube;
   (f) a shaft positioned in an upper portion of the tube coaxially within the longitudinal axis of the tube;
   (g) a pulley fixedly attached coaxially to the shaft above the piston spring;
   (h) a string attached at a first end to the pulley and extending therefrom around at least a portion of the circumference of the pulley and thence to an opposite second end of the string attached to the piston, wherein movement of the piston toward the material disposed within the tube causes the string to unreel from the pulley and thereby rotate the shaft;
   (i) a cap positioned between the sring and the pulley, said cap including a locking tab engaging an interfitting notch in the pulley when the insert is unactivated;
   (j) a cap spring positioned between the cap and the pulley and forcing the pulley against the locking tab, wherein the insert is activated by translating the shaft toward the lower end of the tube against the force of the cap spring, thereby disengaging the notch of the pulley from the locking tab;
   (k) a flat, highly visible sheet disposed over an upper surface of the insert flange; and
   (l) a visible indicator arm fixedly attached to an upper end of the shaft, said indicator arm having a flexible finger attached thereto, wherein a distal end of said finger progressively gathers up the visible sheet from the insert flange when the indicator arm is rotated, thereby exposing the brightly colored upper surface of the insert flange to produce a proportionate analog display of the movement of the piston toward the lower end of the tube, and thus of the amount of material remaining in the tube.

33. The combination of claim 32 wherein one or more openings extend through the lower end of the tube, and wherein one or more pellets of a medicant-containing material are disposed within said lower end of the tube, said pellet(s) progressively dissolving and administering the medicant contained therein to the animal by interaction with moist tissue of the animal.

34. The insert of claim 32 wherein a plurality of temperature sensitive pellets are disposed within the lower end of the tube, each such pellet liquefying when the temperature of the pellet reaches a pre-selected liquefaction temperature which is different than the liquefaction temperature of another of the pellets.

* * * * *